United States Patent [19]

Kobayashi et al.

[11] Patent Number: 4,733,360
[45] Date of Patent: Mar. 22, 1988

[54] DEVICE AND METHOD FOR INSPECTING CARD-LIKE ARTICLES

[75] Inventors: Michiaki Kobayashi, Washimiya; Shigeo Hachiki, Tokyo; Makoto Shibasaki, Tokyo; Satoshi Sasaki, Tokyo, all of Japan

[73] Assignee: Dai Nippon Insatsu Kabushiki Kaisha, Japan

[21] Appl. No.: 743,397

[22] Filed: Jun. 11, 1985

[30] Foreign Application Priority Data

Jun. 14, 1984 [JP] Japan .............................. 59-122776
Jun. 23, 1984 [JP] Japan .............................. 59-129565

[51] Int. Cl.⁴ .................... G06F 15/20; B07C 5/34; G06K 9/00; H04N 7/18
[52] U.S. Cl. ................................. 364/507; 382/8; 358/106; 364/552; 209/598; 209/911; 209/939
[58] Field of Search .............. 364/507, 506, 551, 552; 209/551, 583, 586, 587, 598, 911, 939; 382/8, 57; 358/101, 106, 107

[56] References Cited

U.S. PATENT DOCUMENTS

| | | | |
|---|---|---|---|
| 4,344,146 | 8/1982 | Davis, Jr. et al. | 364/552 |
| 4,458,816 | 7/1984 | Horino et al. | 209/551 X |
| 4,493,420 | 1/1985 | Dennis | 358/106 X |
| 4,496,056 | 1/1985 | Schoenig, Jr. et al. | 364/507 X |
| 4,509,075 | 4/1985 | Simms et al. | 358/106 |
| 4,569,445 | 2/1986 | Kovats et al. | 209/598 X |
| 4,570,180 | 2/1986 | Baier et al. | 382/8 X |

*Primary Examiner*—Parshotam S. Lall
*Assistant Examiner*—Joseph L. Dixon
*Attorney, Agent, or Firm*—Parkhurst & Oliff

[57] ABSTRACT

A card-like article inspection device has an inclined table for placing articles thereon in an upright and aligned state, a camera for detecting the foremost article, and an article feed frame for transferring the article having been inspected along one side of the table in its upright posture. The articles having been inspected are pushed separately into two placing portions of the table. Thus, the articles can be classified into a group of non-defective articles or into a group of defective articles.

15 Claims, 43 Drawing Figures

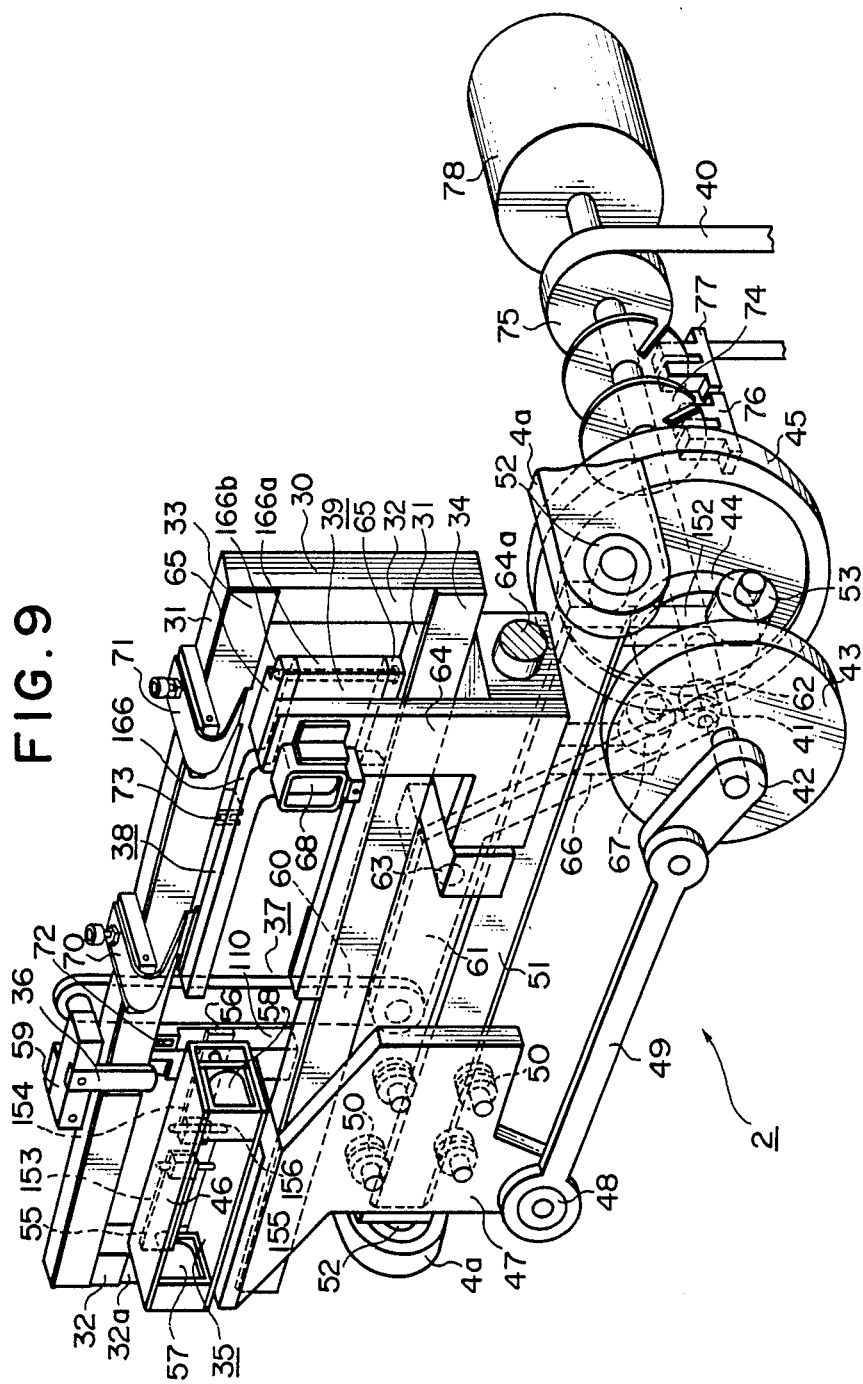

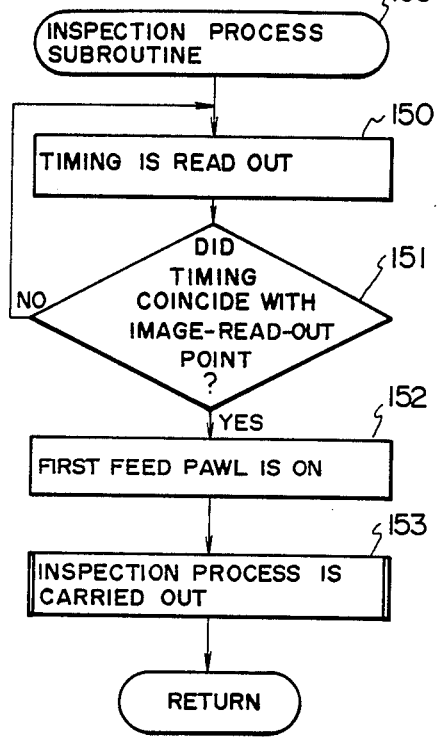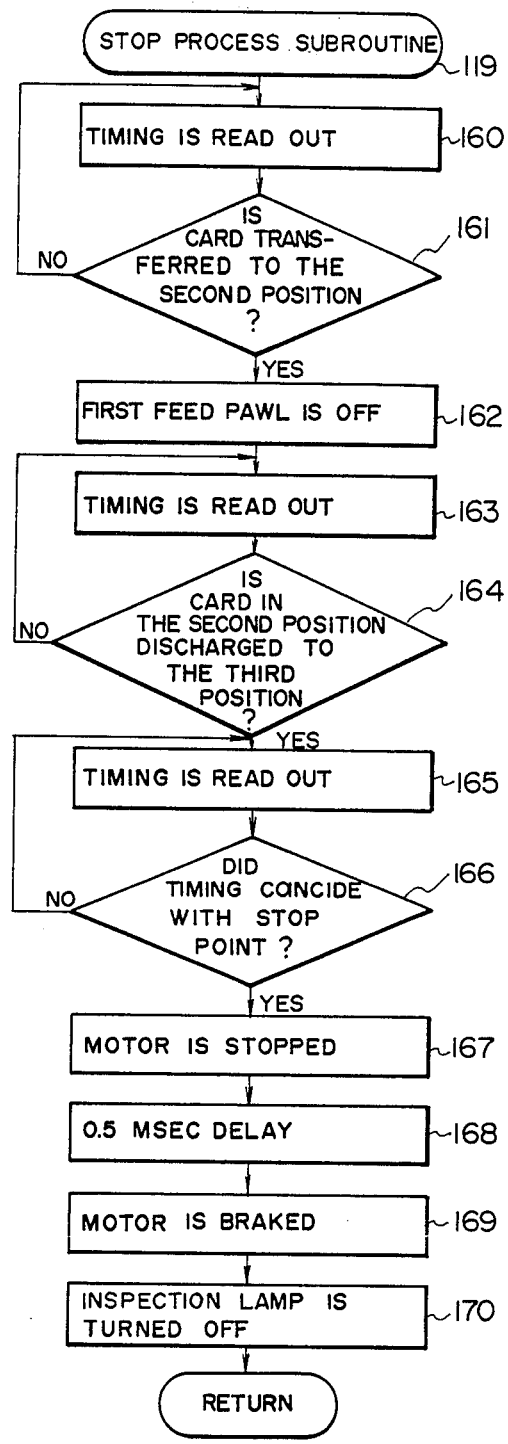

DEVICE AND METHOD FOR INSPECTING CARD-LIKE ARTICLES

BACKGROUND OF THE INVENTION

The present invention relates to a device and method for inspecting the outer appearance of card-like articles made of a single material such as plastic, paper, metal, wood or the like or of a composite material thereof.

So far cards have been widely used in various fields such as banks, railways, etc., but the outer appearances of such cards have been visually inspected by inspectors. That is, the inspectors turn up cards one by one to inspect them. The operation for manually turning up cards one by one so as to expose the whole surface of each card is tedious and only an experienced and skilled inspector can handle a large number of cards. Thus it is extremely difficult to increase the speed of card inspection.

If the speed of card inspection is increased, it becomes impossible for an inspector to visually check the whole surface of each card. Furthermore, if the visual card inspection is continued for a long time, the inspector is fatigued thereby decreasing the card inspection speed and resulting in many erratic inspections. As a result, the cards must be inspected twice or thrice.

Various inspection devices have been proposed and demonstrated in order to inspect the cards while they are being produced, but erratic inspections tend to occur very frequently due to the erratic displacement of the position of an image. Furthermore, the inspection speed is not so fast. Moreover, there has not been proposed a practical inspection device in which the transfer of articles to be inspected is taken into consideration.

SUMMARY OF THE INVENTION

It is an object of the present invention to provide an inspection device and method for inspecting card-like articles in which the card-like articles to be inspected are transferred in such a way that the surface, to be inspected, of each card-like article can be accurately inspected by a camera and which can automatically classify the card-like articles into a group of non-defective card-like articles and a group of defective card-like articles depending upon the result of inspection.

According to one aspect of the present invention, there is provided a card-like article inspection device of the type for inspecting the outer appearance of a card-like article to check whether the surfaces of the card-like article have non-defective images or defective images, thereby classifying the card-like article into a first group consisting of non-defective card-like articles or into a second group consisting of defective card-like articles, comprising: a table which has an article feeding portion for supplying a plurality of articles to be inspected in an upright and aligned state, a defective-article placing portion disposed in parallel with said article feeding portion for discharging defective articles in an aligned state, and a non-defective article placing portion disposed in parallel with said article feeding portion for dischargin non-defective articles in an upright and aligned state; an article transfer means for intermittently transferring an inspected article held in upright state in the transverse direction of the table to the defective article placing portion or the non-defective article placing portion, the article transfer means comprising a guide means disposed along one side of the table for guiding an inspected article held in an upright state, an article feed frame which is disposed so as to be reciprocable along the guide means and which has feed pawl means to retain an inspected article so as to transfer the same from a first position at the front end of said article feeding portion to a second position at the front end of the article placing portion adjacent to the article feeding portion and further from said second position to a third position of the article placing portion further adjacent to the first mentioned placing portion along the guide means, an article positioning mechanism for positioning an article at the first position so that the article thus positioned is subjected to inspection, and an article pushing mechanism for pushing the article which has been inspected and transferred to the second and third positions into the respective placing portions depending upon the results of the inspection, and a synchronizing mechanism for synchronizing the reciprocal movement of the article feed frame with the operation of the article pushing mechanism; a camera which is disposed in an opposed relationship with the first position at the front end of the article feeding portion and which inspects the surface of the article held at the first position; an image processor for comparing a previously stored reference image with the image of the article being inspected, thereby determining whether the article being inspected is non-defective or defective; and a signal processor which controls the image processor and the article transfer means in synchronism with each other.

Further, according to another aspect of the present invention there is provided a method for inspecting the outer appearance of a card-like article to check whether the surfaces of the card-like article have non-defective images or defective images, thereby classifying the card-like article into a first group consisting of non-defective card-like articles or into a second group consisting of defective card-like articles, said method comprising the steps of: placing card-like articles to be inspected on a table in an upright and aligned state; inspecting the outer appearance of the foremost article by a camera opposed to a first position of one side of the table; feeding intermittently the article having been inspected along the one side of the table from the first position to a second position adjacent to the first position while an article having been inspected and located in the second position is fed from the second position to a third position adjacent to the second position along the one side of the table; and pushing the article having been inspected toward a corresponding placing portion on the table according to the result of inspection by the camera.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompanying drawings:

FIG. 9 is a perspective view of a card transfer mechanism;

FIG. 22 is a detailed flowchart of an inspection step;

FIG. 23 is a detailed flowchart of a step for stopping the device shown in FIG. 19;

DETAILED DESCRIPTION OF THE INVENTION

Figure 1:
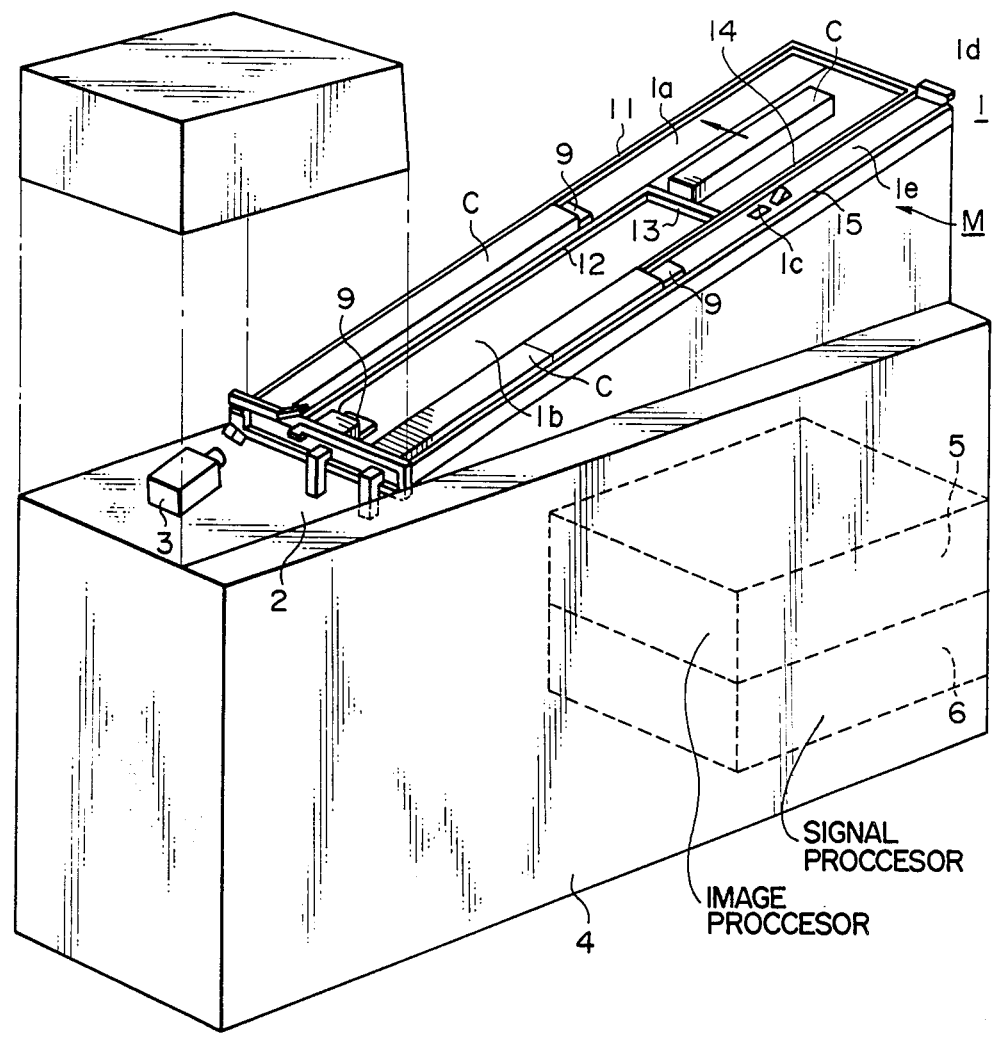
FIG. 1 is a perspective view of a card inspection device having a transfer device in accordance with the present invention.

Referring first to FIG. 1, an inspection device M in accordance with the present invention includes a table 1 inclined at an angle upon which are placed bundles of cards C inclined forwardly at a predetermined angle and a card transfer unit 2 which is disposed along the front side edge of the table 1 in order to transfer the cards C one at a time in the lateral direction of the table 1.

The table 1 comprises a card feeding portion 1a for feeding the cards to be inspected sequentially, a defective card placing portion 1b which is disposed adjacent to the card feeding portion 1a for placing detective cards thereon, a non-defective card placing portion 1c which is disposed adjacent to the defective card placing portion 1b for placing the non-defective cards thereon, a temporary card storage portion 1d adjacent to the upper end of the table 1 for temporarily storing the cards to be inspected and a card storage portion 1e located at the upper end portion of the non-defective card placing portion 1c so that the non-defective cards can be transferred into a card storage box.

A camera 3 for optically detecting or inspecting the surface, to be inspected, of each card C is disposed in an opposed relationship with the front end of the card feeding portion 1a of the table 1 and is electrically connected to an image processor 5 disposed within a main body casing 4 of a card inspection device M. Within the main body casing 4 is disposed a signal processor 6 which interconnects between the image processor 5 and the card transfer unit 2.

Figure 2:
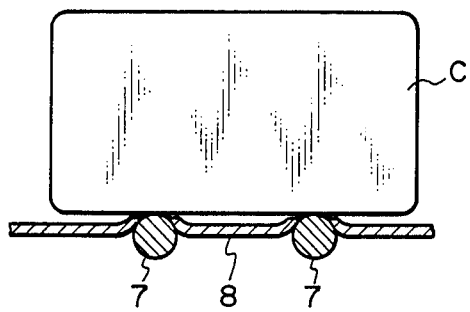
FIG. 2 is a sectional view of a part of a table.
Figure 3:
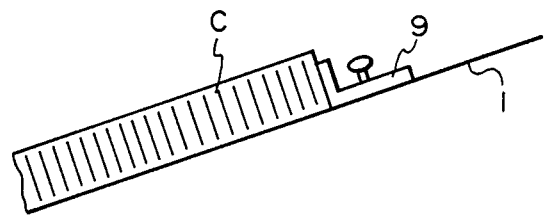
FIG. 3 is a side view showing cards placed upon the table.

As shown in FIG. 2, a pair of parallel guide rails 7 are extended in the longitudinal direction in each of the card feeding portion 1a, the defective card placing portion 1b and the non-defective card placing portion 1c and these guide rails 7 are partially projected upwards beyond the upper surface of a table plate 8 so as to slidably receive the cards C. The rear end of each bundle of cards C is pressed by a pushing member 9 as best shonn in FIG. 3 so that each bundle of cards C is biased downward on the inclined table 1.

Figure 4:
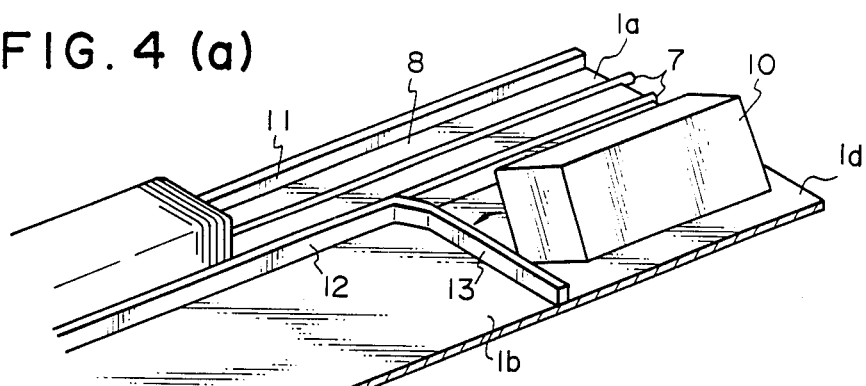
FIGS. 4(a) to 4(c) are perspective views of the table for explaining the mode of placing cards onto a card feeder.
Figure 4:
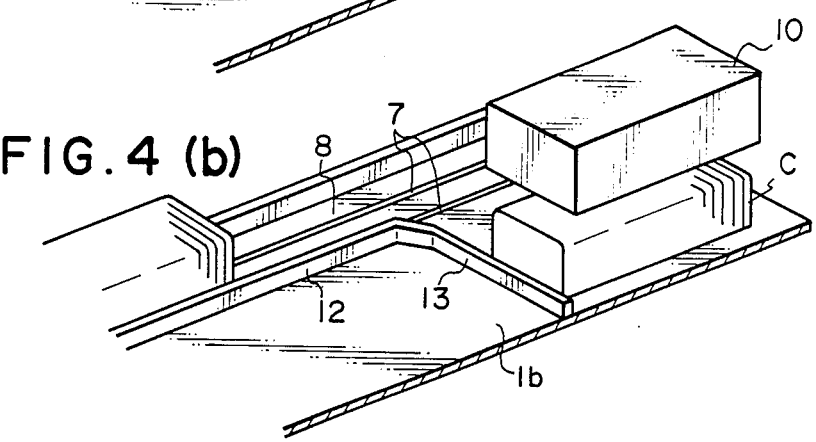
Figure 4:
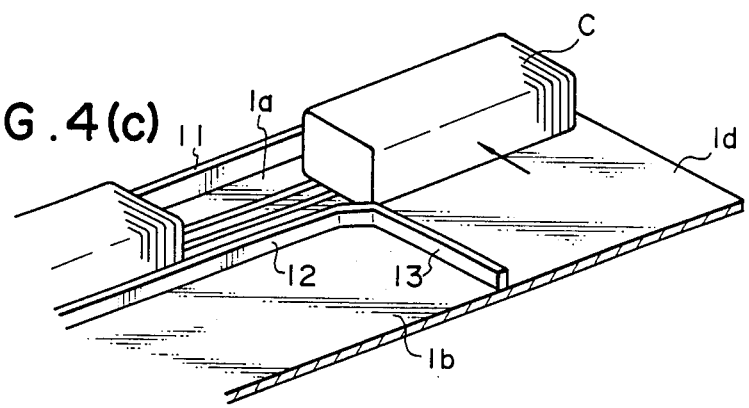

Still referring to FIG. 1, the temporary card storage portion 1d is located adjacent to the card feeding portion 1a and a bundle of cards C is temporarily placed on the storage portion 1d when a card box 10 containing a plurality of cards C is turned upside down as shown in FIG. 4. The bundle of cards C thus placed on the storage portion 1d is slid transversely to the upper part of the card feeding portion 1a. Upright guide plates 11 and 12 are attached to the longitudinal sides of the card feeding portion 1a and the temporary card storage portion 1d and the defective card placing portion 1b are separated from each other by means of a guide or partition plate 13 which is laterally extended.

Figure 5D:
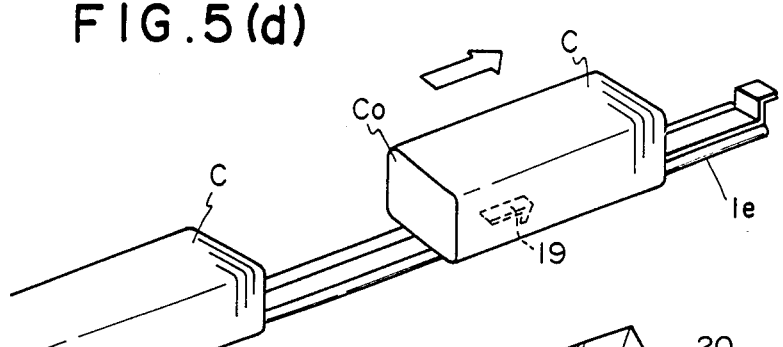
FIGS. 5(c) to 5(f) are perspective views for explaining the mode of operation of the card storage portion.
Figure 5E:
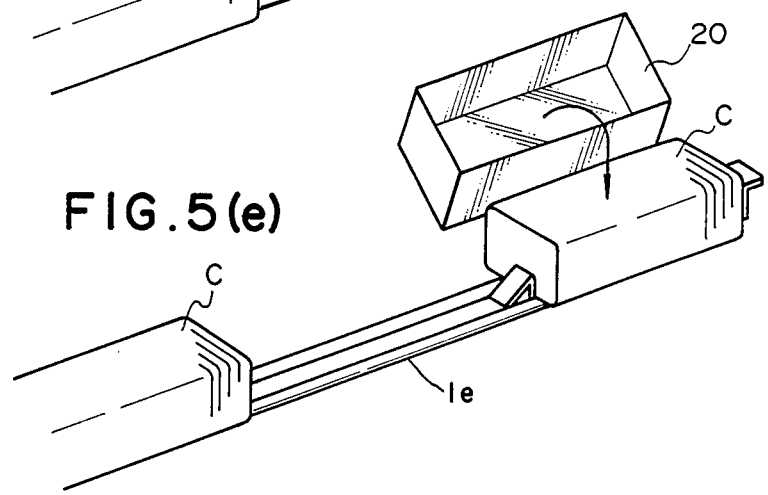
Figure 5F:
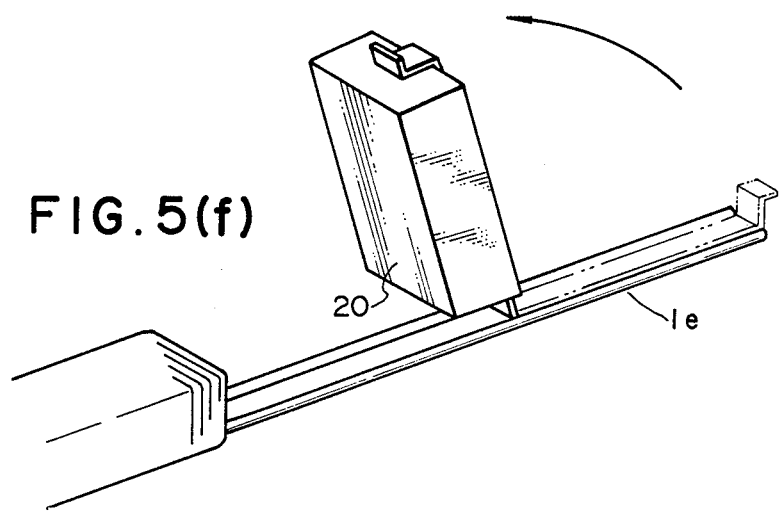
Figure 5A:
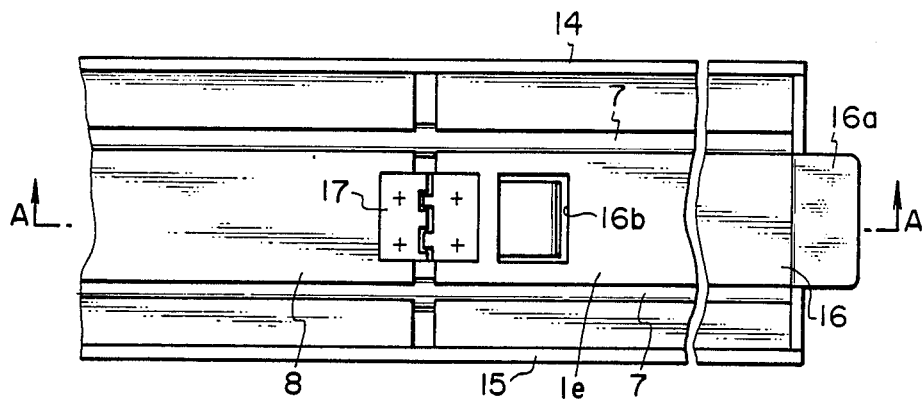
FIG. 5(a) is a plan view of a card storage portion of the table.
Figure 5B:
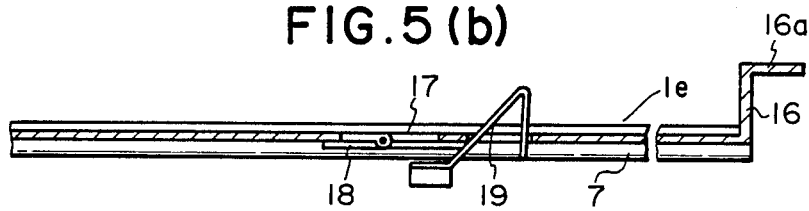
FIG. 5(b) is a sectional view taken along the line A—A of FIG. 5(a)
Figure 5C:
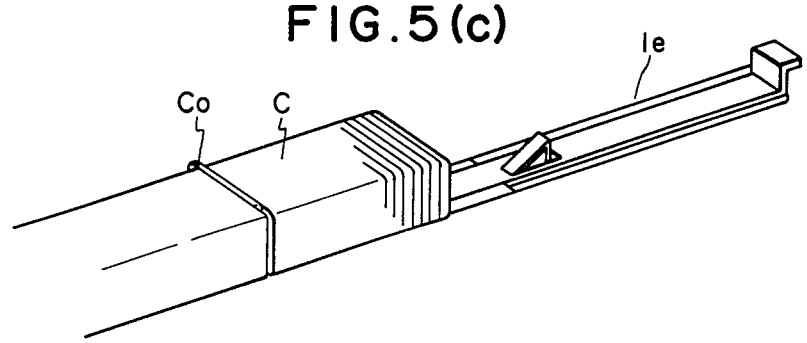
Figure 6:
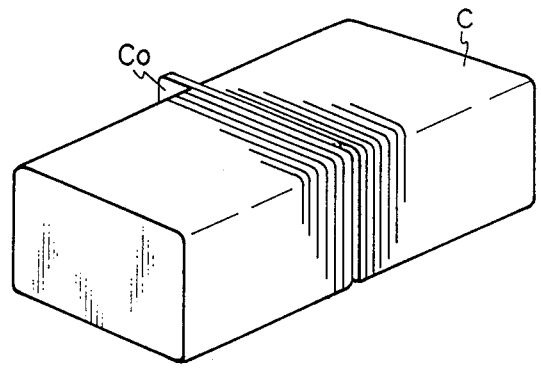
FIG. 6 is a perspective view showing a state wherein a predetermined number of cards are grouped by a partition card.

As shown in FIGS. 1 and 5, the non-defective card placing portion 1d has upright guide plates 14 and 15 disposed along both the longitudinal sides, respectively, of the placing portion 1d and the distance between the guide plates 14 and 15 is slightly greater than the width of the card C so that, as shown in FIG. 6, one card Co is projected laterally from the bundle of cards C, thereby dividing the non-defective cards C into a plurality of groups each containing of a predetermined number of cards C.

As shown in FIG. 5(a), the upper end portion of the non-defective card placing portion 1c terminates in a card storage portion 1e adapted to swing upwardly. Therefore, a swingable bed 16 is joined with a hinge 17 to the upper end of the table plate 8. An opening 16b is formed in the swingable bed 16 adjacent to the hinge 17 and a stop spring 19 is etended through the opening 16b. A knob 16a is formed at the free end of the swingable bed 16 so that an operator may engage his finger with knob 16a.

When a predetermined number of non-defective cards C are put into a storage box 20, a group of non-defective cards C which is separated from the remaining cards C by the card Co is displaced to the right as shown in FIGS. 5(c) to 5(f) so as to be separated from the remaining cards C and placed over the swingable bed 6 while pressing down and passing past the stop spring 19. When the group of cards C thus separated passes the stop spring 19, the latter is sprung back upwardly again, thus stopping the downward movement of the group of cards C. Thereafter a storage box 20 is put over the group of cards C and the operator grips the knob portion 16a to swing the swingable bed 16 upwardly. Next, the operator removes the storage box 20 containing the group of cards from the swingable bed 16. Thus, the group of non-defective cards C can be put into the storage box 20 in a very simple manner.

Figure 7:
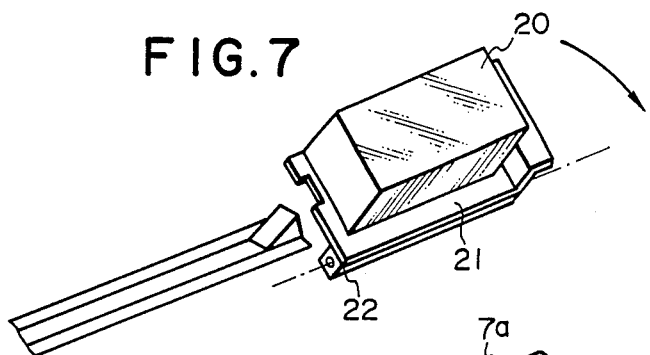
FIG. 7 is a perspective view of cards for explaining another embodiment of a card storage portion.

As shown in FIG. 7, the swingable bed 21 may be so designed and constructed that it can swing in the transverse direction of the table 1. More particularly, the swingable bed 21 is swingable about a hinge 22 attached along one side of the swingable bed 21.

Figure 8:
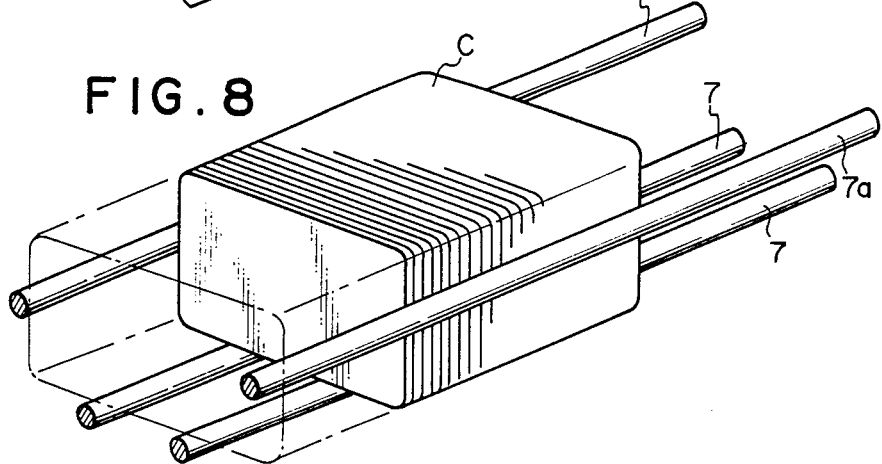
FIG. 8 is a perspective view for explaining another embodiment of a table upon which cards are placed.

Furthermore, as shown in FIG. 8, instead of the guide plates of the table 1 along which the cards C slide, side rails 7a which are substantially similar to the guide rails 7 may be extended along the side surfaces of cards C.

Next, the construction of the card transfer unit 2 will be described. Referring now to FIG. 9, the card transfer unit 2 has a rectangular main guide frame 30 extended in the transverse direction of the table 1 and comprising horizontal frames 31, 31 and vertical frames 32, 32. Card engaging plates 33, 34 for engaging with the upper and lower sides of the card C are attached to the front sides of the upper and lower horizontal frames 31, 31, respectively. The plates 33, 34 serve to guide the cards C. A card feed frame 35 is disposed in front of the main frame 30 in such a way that the card feed frame 35 is reciprocable in the longitudinal direction of the main frame 30 and a card positioning member 36 is disposed at a position corresponding to the card feeding portion 1a on the main frame 30 (that is, at a position adjacent to the left end of the main frame 30 in FIG. 9) so that the card C fed from the card feeding portion 1a is placed at a normal position in front of the camera 3. The card positioning member 36 is a component part of a card positioning mechanism 37 which causes the card positioning member 36 to be moved vertically.

A defective card pushing mechanism 38 and a non-defective card pushing mechanism 39 which is integral with the defective card pushing mechanism 38 are disposed at the upper right side of the main frame 30 as viewed in FIG. 9.

The above-described transfer frame and pushing mechanisms are driven through a crankshaft 42 whose one end is connected to a main shaft 41 rotated by a timing belt 40 and through first, second and third cams 43, 44 and 45 carried on the main shaft 41 and these component parts of members constitute a synchronizing mechanism for synchronizing the operations of the above-described mechanisms.

The card feed frame 35 comprises a reciprocating frame 46, a supporting frame 47 for supporting the reciprocating frame 46 and a link 49 whose one end is connected to the lower end of the supporting frame 47 through a ball joint 48. The supporting frame 47 is reciprocable through rollers 50, 50, . . . along a slide rail 51 extended horizontally below the main guide frame 30. The opposite ends of the slide rail 51 are supported through bearings 52, 52 by arms 4a, 4a respectively, of the main body casing 4 (FIG. 1). The upper end of a link 152 is attached to the right end of the slide rail 51 while the lower end thereof carries a cam follower 53 which is in engagement with the first cam 43 so that the slide rail 51 is caused to swing about its axis.

A first feed pawl member 153 and a second feed pawl member 154 are mounted on the reciprocating frame 46 of the card feed frame 35 on the side of the main frame 30 and one ends of the first and second feed pawl members 153 and 154 are pivoted with pivot pins 155 and 156, respectively, while the other ends thereof terminate in feed pawls 55 and 56. The first or left feed pawl member 153 is connected to a first solenoid 57 while the second or right feed pawl member 154 is connected to a second solenoid 58.

Figures 10A, 10B:
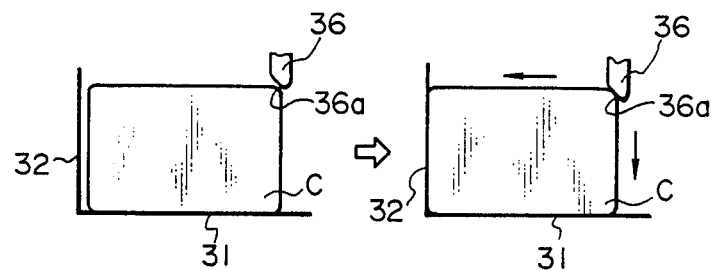
FIGS. 10(a) and 10(b) are elevational views of a card for explaining the mode of operation of a card positioning mechanism.

The card positioning mechanism 37 causes the positioning member 36 to be vertically moved in synchronism with the feed of cards and comprises a supporting member 59 for supporting the positioning member 36, a vertical link 60 causing the supporting member 59 to be moved vertically, an arm 61 whose one end is connected to the lower end of the vertical link 60 and a cam follower 62 carried by the arm 61 at the other end thereof. The cam follower 62 is brought into contact with the peripheral surface of the second cam 44 and the arm 61 is pivotably supported by a pivot pin 63 at a point at which the arm 61 is bent. As shown in FIG. 10, the card positioning mechanism 37 actuates its positioning member 36 in such a way that the tapered surface 36a of the positioning member 36 pushes one corner of the card C to engage the left side of the card C with the left vertical frame 32 of the main frame 30 so that the card C to be inspected is brought to a predetermined position. As a result, the card C is placed at the normal position in front of the camera 3.

Figure 16A:
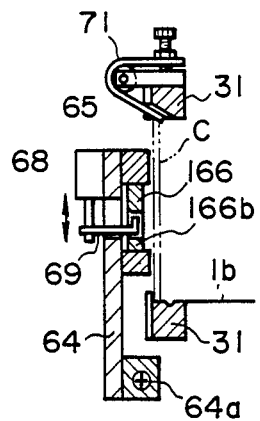
FIGS. 16(a) and 16(b) are vertically sectional views for explaining the mode of operation of a defective card pushing mechanism.

The non-defected card pushing mechanism 39 comprises a pushing frame 64 pivotably attached with a pivot pin 64a to the main body casing 4, two non-defective card pushing members 65, 65 attached to the upper end of the frame 64, a link 66 the upper end of which is attached to the lower end of the frame 64 and which is extended downwardly and a third cam follower 67 carried by the link 66 at the lower end thereof. The third cam follower 67 rolls along the cam surface of the third cam 45 so that the pushing frame 64 is caused to swing about an axis extending along the main guide frame 30. The root portion 166a of a defective card pushing frame 166 is supported between the upper and lower non-defective card pushing members 65, 65 and is held therebetween by means of a pivot pin 166b. The pushing frame 64 is connected to a third solenoid 68. As best shown in FIG. 16, the third solenoid 68 has an actuating rod 69 whose leading end is normally fitted into an opening 166b of the root portion 166a of the defective card pushing frame 166. In order to discharge a defective card, the solenoid 68 is energized so that the actuating rod 69 is raised. As a consequence, the actuating rod 69 is forced to be inserted between the pushing frame 64 and the defective card pushing frame 166 so that the pushing frame 166 is pushed toward the main frame 30.

Leaf springs 70 and 71 are mounted on the upper horizontal frame 31 of the main frame 30 in an opposed relationship with the defective card placing portion 1b and the non-defective card placing portion 1c, respectively, and they cooperate with the pushing frame 166 and the pushing members 65 so as to hold the upper end of a card in a respective position.

Figure 17:
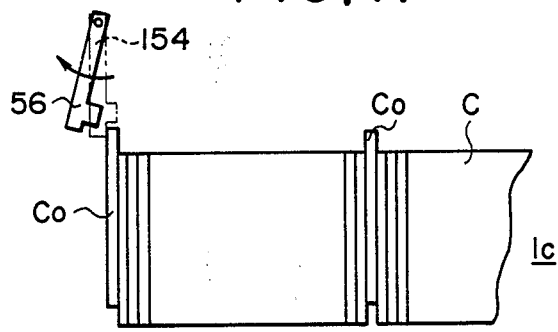
FIG. 17 is an elevational view for explaining the mode of operation of a second feed pawl which groups non-defective cards into a plurality of groups each consisting of a predetermined number of non-defective cards.

In addition to the cams, the main shaft 47 carries two disks 74 and 75 and there are provided photoelectric switches 76 and 77 for the disks 74 and 75, respectively. As will be described in detail below, the photoelectric switch 76 is used to determine a timing for releasing the second feed pawl 56, thereby placing the partition card in a position different from other cards so that a predetermined number of non-defective cards C are grouped (FIG. 17). The photoelectric switch 77 is used to determine a timing for energizing the third solenoid 68 for discharging a defective card. The main shaft 41 further carries an encoder 78 for timing of various operations.

Figure 11:
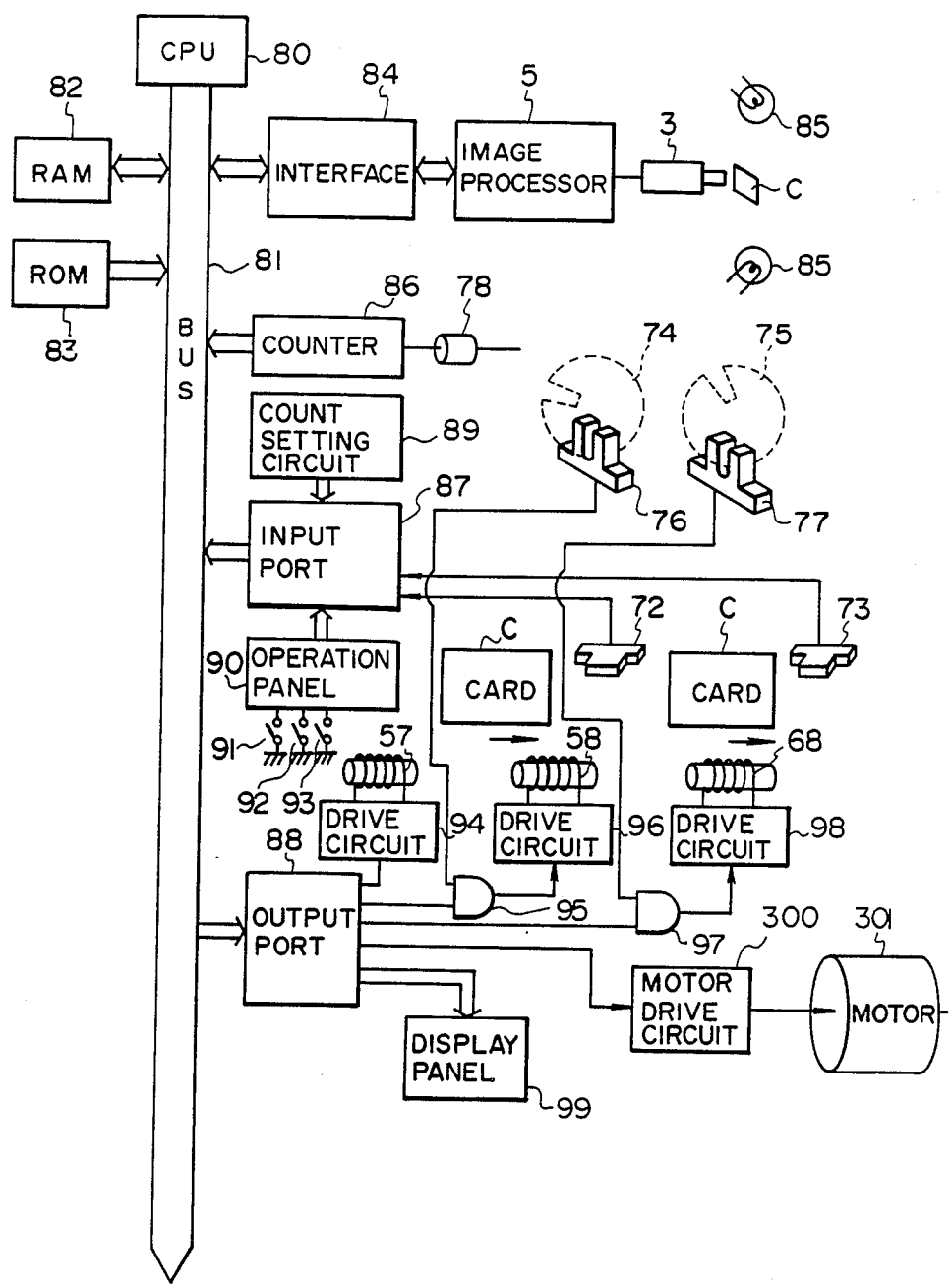
FIG. 11 is a block diagram of an electrical system of the transfer device in accordance with the present invention.

As shown in FIG. 11, the signal processor 6 which is disposed in the main body casing 4 has a CPU 80 which in turn is connected through a bus 81 to a RAM 82 and a ROM 83 and is further connected through an interface 84 to the image processor 5. The surface of the card C which is illuminated by illumination light sources 85, 85 is inspected by the camera 3. The pulses from the encoder 78 are applied through a counter 86 to the bus 81 and an input port 87 and an output port 88 are connected to the bus 81. To the input port 87 is connected a count setting circuit 89 which sets the count of the encoder 78 and, in response to the number of pulses from the encoder 78, determines not only a timing for energizing the solenoid 57 but also a timing for starting the image processing when the card feed frame 35 is retracted from the card to be inspected. An operation panel 90 is also connected to the input port 78. The operation panel 90 has a switch 91 for setting a reference data into the image processor 5, an inspection switch 92 for inspecting the card C and a stop switch for stopping the inspection of the card. The input port 87 is further connected to sensors 72 and 73 which are provided, spaced away from each other, on the horizontal frame 31 to detect the passage of cards C, whereby the number of defective cards and the number of non-defective cards can be counted.

To the output port 88 are connected the first solenoid 57 through a drive circuit 94, the second solenoid 58 through an AND gate 95 and a drive circuit 96 and the third solenoid 68 through an AND gate 97 and a drive circuit 98. The signals from the photoelectric switches 76 and 77 are inputted to the AND gates 95 and 97, respectively, so that the energization of the second and third solenoids 58 and 68 is carried out. Further, to the output port 88 are connected a display panel 99 for displaying the number of cards C having been processed and a motor 301 for rotating the main shaft 41 through a motor drive circuit 300.

Figure 12:
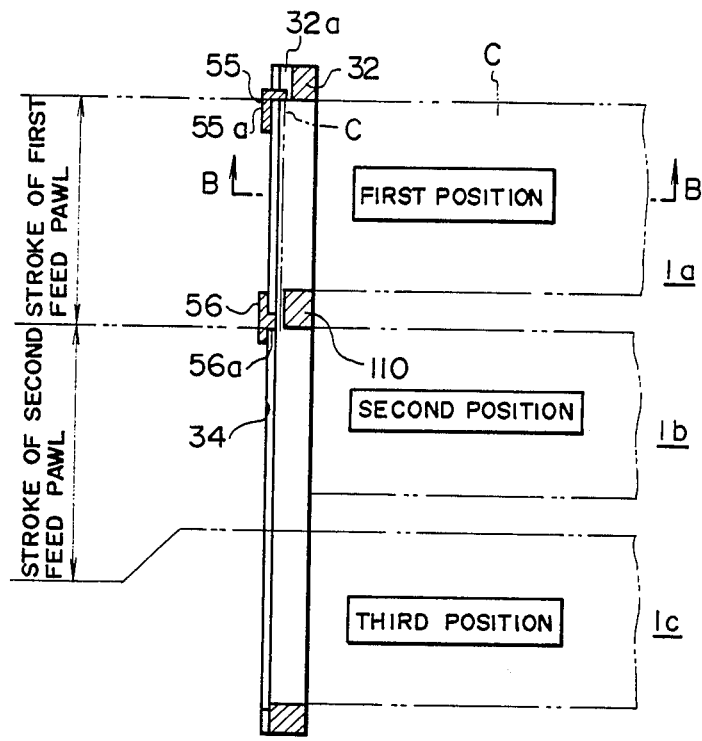
FIG. 12 is a plan view for explaining the mode of operation of feed pawls.
Figure 13:
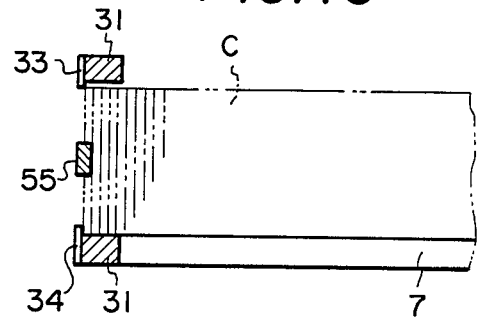
FIG. 13 is a sectional view taken along the line B—B of FIG. 12.

Next, the mode of operation of the device of the present invention will be described. Referring to FIGS. 12 and 13, the foremost card C of the group of cards on the card feeding portion 1a is held by the first and second feed pawsl 55 and 56 at its both sides and the projections 55a and 56a of the pawls 55 and 56 are shorter than the thickness of the card C. The front surface of the vertical frame 32 is partially cut out in order to provide a space 32a for permitting the reciprocal movement of the first feed pawl 55. A partition plug 110 is disposed between the foremost card position of the card feeding portion 1a and the second position or the foremost position of the defective card placing portion 1b and the front end of the partition plug 110 is positioned adjacent to the card receiving plates 33 and 34 so as to permit the passage therebetween only one card. When the card C at the first position (the foremost position of the card feeding portion 1a) is detected as non-defective, it is transferred through the second position (the foremost position of the defective card placing portion 1b) to the foremost or third position of the non-defective card placing portion 1c. The transfer of the card C will be further described in detail with reference to FIG. 14.

That is, when the first and second feed pawls 55 and 56 are located at both sides of the first position, the card $C_1$ which has been already inspected is held in the first position and the second feed pawl 56 engages one side of the card $C_2$ in the second position. Upon rotation of the main shaft 41, the reciprocating frame 46 of the card feed frame 35 is displaced to the second position (Steps A, B and C) along the slide rail 51 while holding the cards $C_1$ and $C_2$. In this case, the card $C_2$ which is held by the second feed pawl 56 is displaced to the third position. Next the reciprocating frame 46 is to be returned to its initial position, but due to the engagement of the first cam 43 with the first cam follower 53 the slide rail 51 is caused to swing in the direction in which the reciprocating frame 46 is separated or moved away from the main frame 30. As a result, the first and second feed pawls 55 and 56 are separated from the cards $C_1$ and $C_2$ (Step D). Under these conditions, the reciprocating frame 46 returns to its initial position while holding the first and second feed pawls 55 and 56 (Steps E and F) and then the Step A is started again.

Figure 14:
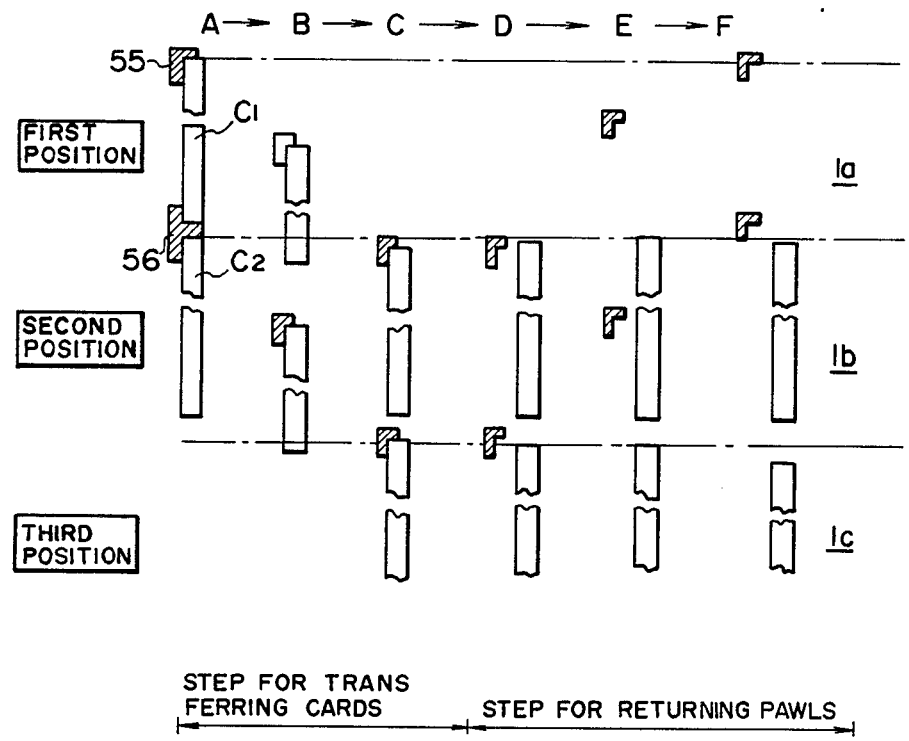
FIG. 14 is a plan view for explaining the mode of operation of feed pawls.
Figure 15A:
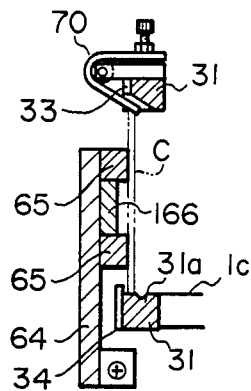
FIGS. 15(a) and 15(b) are vertically sectional views for explaining the mode of operation of a non-defective card pushing mechanism.
Figure 15B:
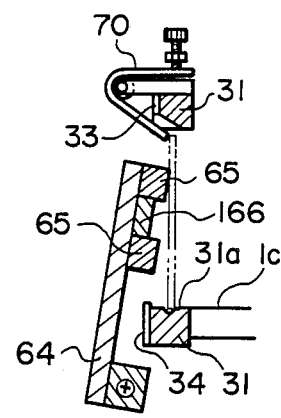
Figure 16B:
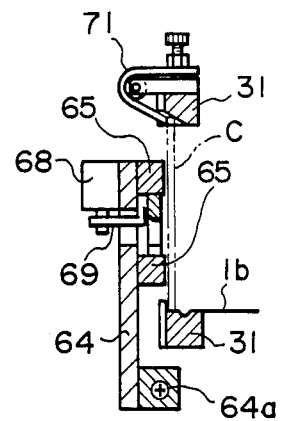

In synchronism with the operation of the feed frame 35, the defective card pushing mechanism 38 and the non-defective card pushing mechanism 39 are activated. If the card C is inspected and found non-defective, the non-defective card is transferred to the third position (FIG. 14). As the third cam 45 engages with the third cam follower 67 so that the pushing frame 64 is caused to rotate in the clockwise direction as shown in FIG. 15, the non-defective card C is pushed into the non-defective card placing portion 1c by the card pushing member 65. When a card in the second position is defective, the defective signal from the camera 3 is inputted through the CPU 80 and the output port 88 to the AND gate 97 while the signal from the photoelectric switch 77 is also inputted to the AND gate 97 so that the third solenoid 68 is energized. Therefore, as shown in FIG. 16, the defective card pushing frame 166 is caused to be moved toward the defective card C so that as in the case of the non-defective card, the defective card is pushed into the defective card placing portion 1b by the frame 166 when the frame 64 is swung toward the main frame 30. When the non-defective card and the defective card are pushed into the placing portions 1b and 1c, respectively, the cards are respectively placed in the respective foremost positions of the placing portions 1b, 1c while the upper sides of the cards push upward the lower ends of the leaf springs 70 and 71, respectively. Thereafter, the cards are retained and prevented from being returned toward the respective mechanisms 38, 39 because the lower ends of the leaf springs 70, 71 hold the upper sides of the cards, respectively, (FIGS. 15(b), 16(b)). A groove 31a is formed in the lower horizontal frame 31 so that the lower sides of the cards pushed by the pushing frame 64 and the defective card pushing frame 166 are forcibly fitted into the groove 31a.

It is desired that a predetermined number of non-defective cards are grouped as shown in FIGS. 6 and 17. In this case, an operator sets a desired number of non-defective cards into RAM 82 through CPU 80 (FIG. 11). When a predetermined number of cards C is detected by the sensors 72 and 73, the signal is inputted through the output port 88 to the AND gate 95. When the signal from the photoelectric switch 76 is inputted to the AND gate 95, the solenoid 58 is energized so that the second feed pawl 56 is released from the partition card Co before the partition card Co completely reaches the third position. Under these conditions, the partition card Co is pushed into the non-defective card placing portion 1c as shown in FIG. 17.

When the operation is to be stopped, the pulse signal is inputted through CPU 80 to the drive circuit 94 (FIG. 11). In this case, when the reciprocating frame 46 is brought to the second position (Step D) as shown in FIG. 14, the first solenoid 57 is energized so that the first feed pawl 55 is moved toward the frame 46 and so that no card is transferred by the pawl 55 when the frame 46 is moved to its normal stop position (e.g., the second position).

The position of the defective card placing portion 1b and the position of the non-defective card placing portion 1c may be exchanged.

Next the control program of the present invention will be described.

Figure 18:
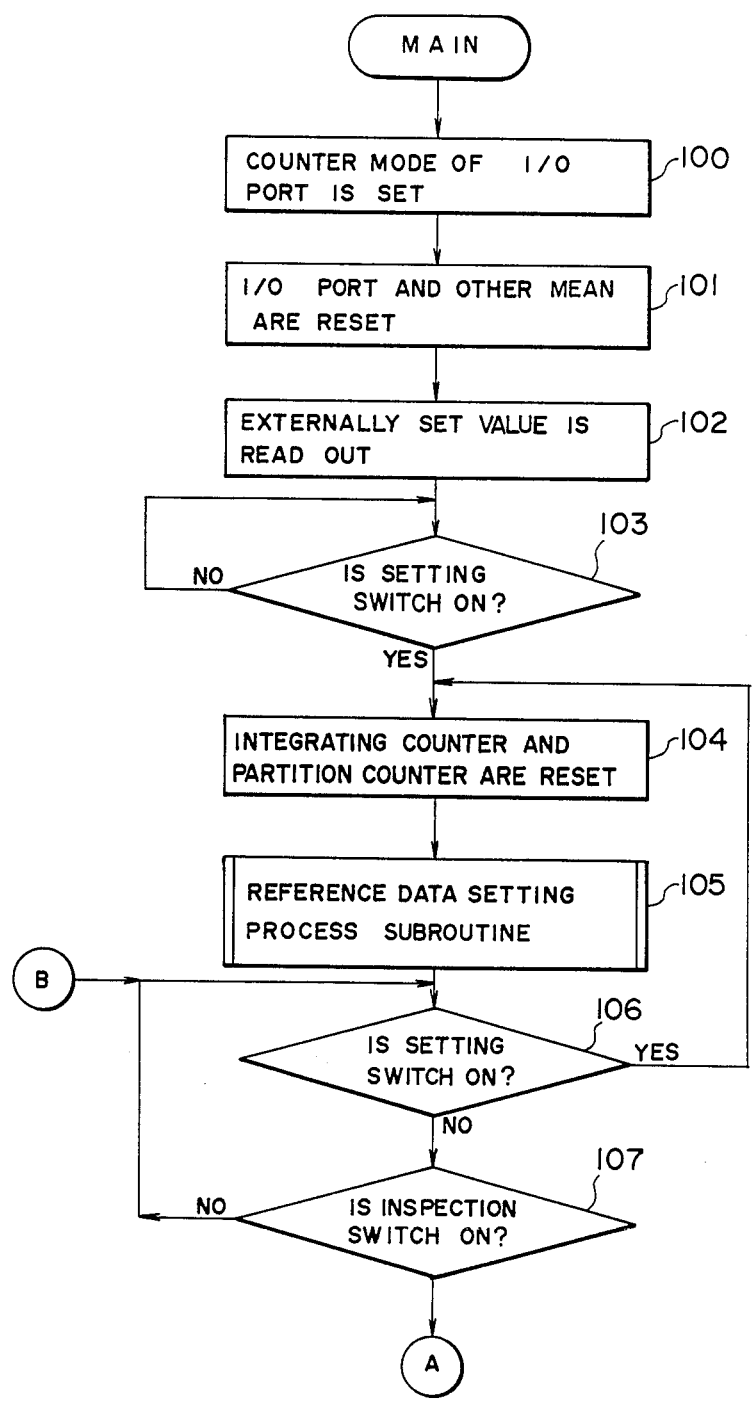
FIG. 18 is a flowchart of a main program of the device in accordance with the present invention.

Referring first to FIG. 18, the I/O ports 87, 88 (the input port 87 and the output port 88 are shown as separate units in FIG. 11, but they are designed and constructed as a unit) must be set as to whether the I/O port is used as an input port or as an output port. Further, the mode of opeation of the counter 86 must be set (Step 100). Therefore the device (I/O port, other means) is reset (Step 101) and the externally set value for indicating, for example, the count of the encoder 87 for setting a timing for energizing the solenoid 57 and so on is read out (Step 102).

Next the setting switch 91 is turned on. When the setting switch 91 is turned on, an integrating counter for counting a number of non-defective cards having been processed and a partition counter for counting a number of cards to be partitioned are set on RAM (SET 104) via the count setting circuit 89. Thereafter, a non-defective card is read out by the camera and the reference data is stored into the image processor 5 (Step 105). In this case, when the setting switch 91 is turned on again, a new counter can be set and reference data can be prepared. If the setting switch is not turned on again (Step 106), the inspection switch 92 is turned on to start the inspection of cards (Step 107).

Then the motor 301 is energized or driven (Step 108) and the inspection is started (Step 109). If the inspected card is found non-defective, an OK lamp is turned on (Step 110 and Step 111). As the inspection is continued, the number of OK or non-defective cards is continuously counted and a partition counter for a number of cards to be partitioned counts the number of cards (Step 112). When the partition counter counts up a predetermined number of cards which is, for example, 250 cards, the second feed pawl 56 is actuated (FIG. 17) and releases the card (Steps 113 and 114).

Thereafter the partition counter is reset (Step 115). If the stop switch 93 is turned on (Step 118), the motor 301 is de-energized (Step 119). If a defective card is found in the step 110, an NG lamp is turned on (Step 116) and then the third solenoid 68 is energized (Step 117) so that the defective card is pushed or discharged into the defective card placing portion 1b. If the stop switch 93 is not pushed down in the step 118, the card inspection is continued without any interruption.

Figure 20:
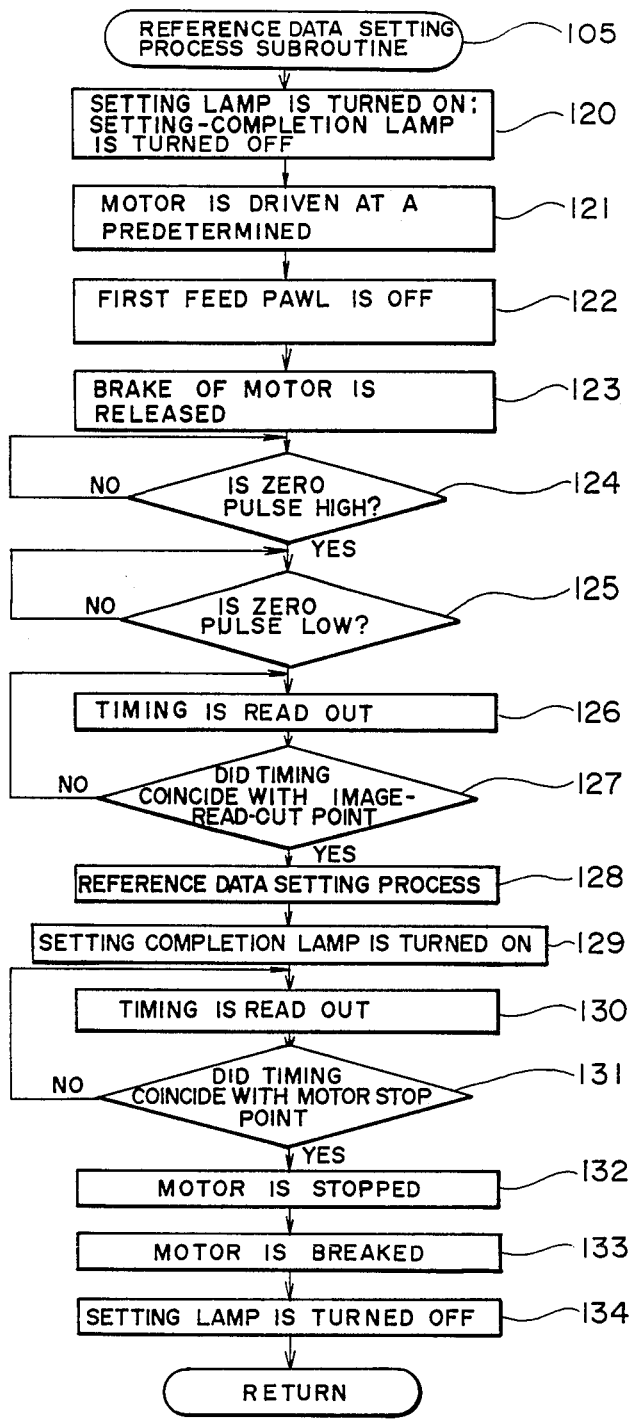
FIG. 20 is a detailed flowchart of a step for a reference data process shown in FIG. 18.

Next the setting of the reference data in the Step 105 is carried out as shown in FIG. 20. First, a lamp for displaying the setting process is turned on and a lamp for displaying that the setting has been completed is turned off (Step 120). The motor 301 is driven at a predetermined low speed (Step 121). Then, the first feed pawl 55 is released so that the first feed pawl 55 does not hold a non-defective card when the card feed frame 35 is moved from the first position to the second position. Thereafter, a brake applied to the motor 301 is released (Step 123) and a zero-point signal from the encoder 78 is monitored in such a way that whether or not a zero-pulse is high at the first stage is read and then whether or not the zero-pulse is low is read (Steps 124 and 125). Next the count of the counter 86 of the rotary encoder 78 is read out and the value set by the count setting circuit 89 (for setting the time when the camera 3 picks up an image) and the count of the counter 86 of the rotary encoder 78 are compared with each other (Step 126). If they coincide with each other, the camera 3 reads out a non-defective card and the reference data is stored in the image processor (Steps 127 and 128).

When the reference data has been stored in the image processor 5, a lamp for displaying that the reference data has been set is turned on (Step 129). When the number of pulses from the encoder 78 reaches a value at which both the feed pawls, that is, the motor 301 must be stopped, the motor 301 is deenergized (Steps 130, 131 and 132) and is braked (Step 133). The lamp for displaying that the setting is being carried on is turned off (Step 134) and the program returns to the Step 106.

Figure 19:
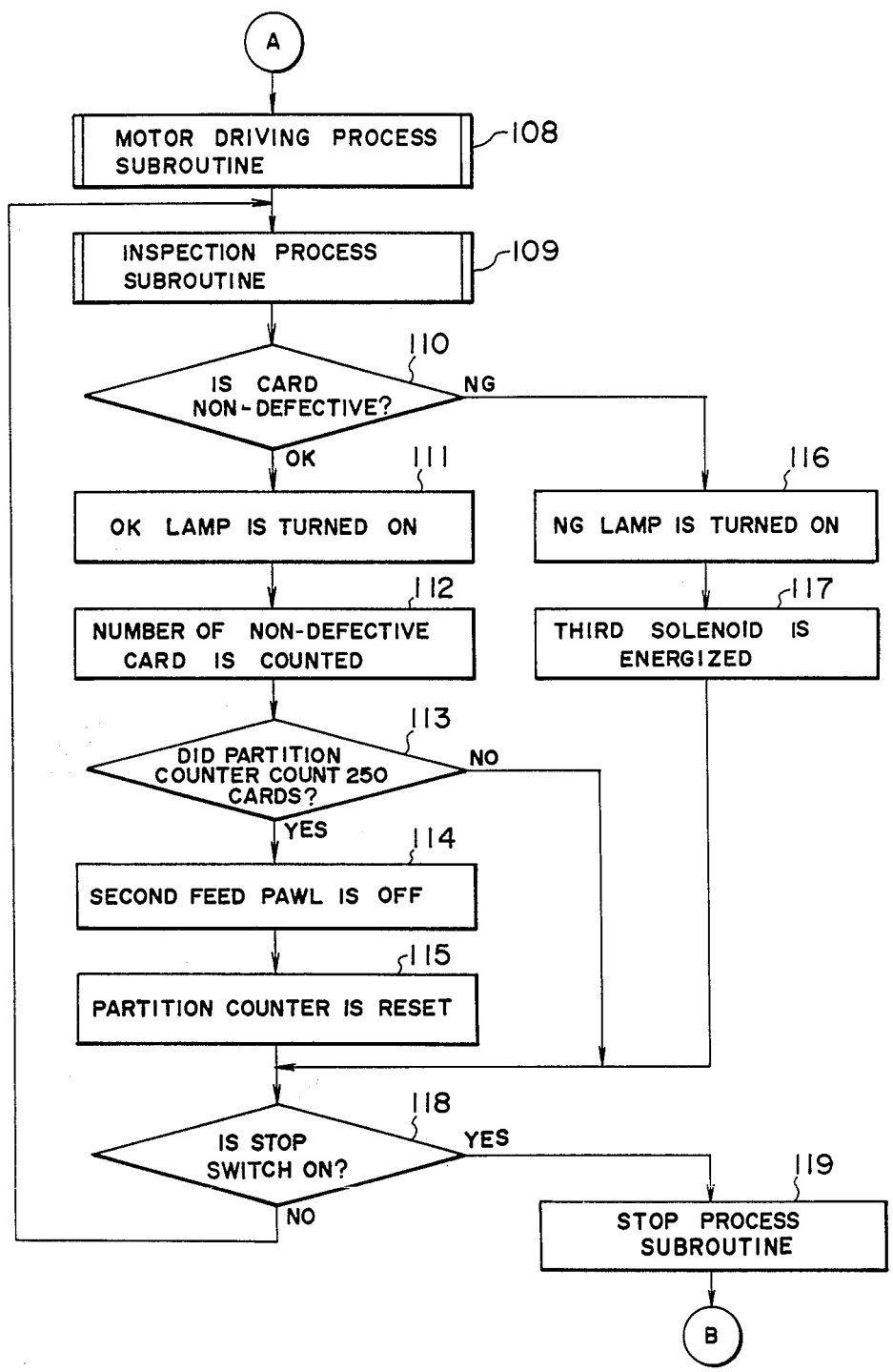
FIG. 19 is a detailed flowchart of a step for a motor driving process shown in FIG. 18.
Figure 21:
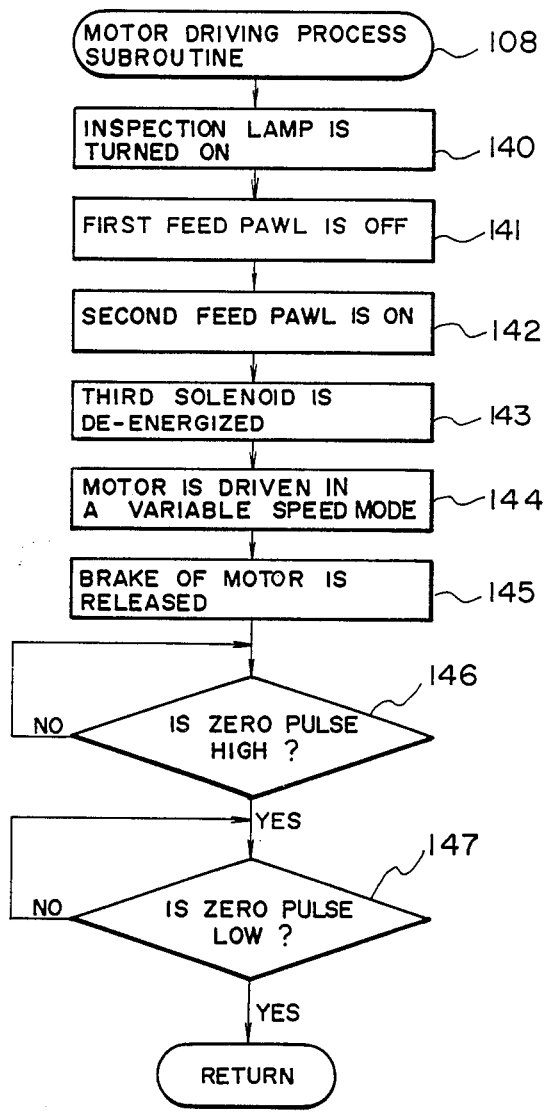
FIG. 21 is a detailed flowchart of a step for driving a motor shown in FIG. 19.

The energization of the motor 301 in the Step 108 shown in FIG. 19 is carried out as shown in FIG. 21. A lamp for displaying that the inspection is being carried out is turned on (Step 140) and the first feed pawl 55 is released to a position where it does not hold a card while the second feed pawl 56 is brought to the position at which it holds a card (Steps 141 and 142) because the card feed frame 35 can be moved from the first position where the camera 3 is located to the second position while transferring a card located in the second position to the third position if the card in the second position is non-defective without transferring a card located in the first position. The third solenoid 68 is deenergized and the motor 301 is set into a variable speed mode (Steps 143 and 144). Thereafter brake applied to the motor 301 is released (Step 145) and the zero-point signal from the rotary encoder 78 is monitored in the same manner as that shown in FIG. 20 (Steps 146 and 147). When the zero-point signal is detected, the program returns to the inspection (Step 109).

The inspection in the Step 109 in FIG. 19 is carried out as shown in FIG. 22. The count of the counter 86 of the encoder 78 is read out (Step 150) and when the image-read-out point is reached (that is, when the card feed frame 35 is retracted away from the camera 3), the first feed pawl 55 is actuated so that the card feed frame 35 is ready to be returned to its initial position (Step 152). Next the inspection is carried out (Step 153) and then the program returns to the step in which a card is inspected and found non-defective or defective (Step 110).

FIG. 23 shows in detail the sub-routine of the operation stop process 119 shown in FIG. 19. When the stop switch 93 is turned on, the output from the encoder 78 is read out (Step 160) and the sensor 72 detects whether the last card having been inspected has been transferred to the second position or not. When it is found that the card has been transferred to the second position, the first feed pawl 55 is released so as not to hold a new card (Steps 161 and 162). Next in response to a proper timing (Step 163), the card which has been transferred to the second position is further transferred to the third position by the feed frame 35 (Step 164) and further in response to a proper timing (Steps 165 and 166), the motor 101 is stopped (Step 167) so that the card feed frame 35 is stopped at a predetermined stop position and 0.5 msec. later the brake is applied to the motor 301 (Steps 168 and 169). Thereafter the lamp displaying that the inspection is being carried on is turned off (Step 170).

Figure 24:
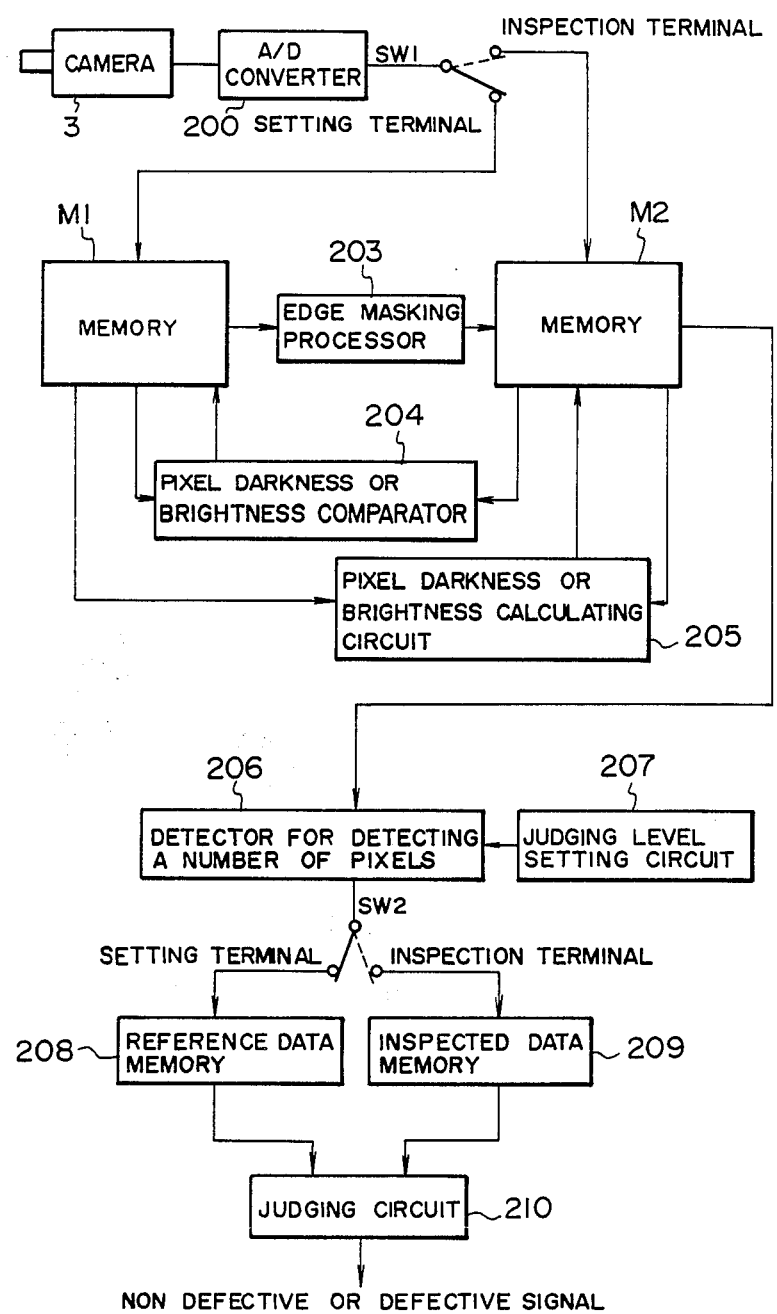
FIG. 24 is a block diagram of an image processor.

The image inspection method by means of the image processor 5 will now be described. Referring to FIG. 24, the output signal from the camera 3 is converted into the digital signal by an A/D converter 200 and is inputted to a first memory 1 or a second memory 2 through a selector switch SW1. Non-defective image data or reference image data are stored in the memory M1 while the image data of a card being inspected are stored in the memory M2. The non-defective image data which are stored in the memory M1 are subjected to the edge masking process in which the edges of an image are masked by an edge masking processor 203 and are inputted to the memory M2. The data stored in the memories M1 and M2 are compared with each other by a pixel-darkness or brightness comparator 204 so that the higher or greater data between them are stored in the memory M1. Furthermore the difference between the data stored in the memories M1 and M2 is obtained by a pixel-darkness or brightness calculating circuit 205 and is inputted to the memory M2.

The output from the memory M2 is inputted to a detector 206 for detecting the number of pixels or picture elements so that the number of pixels is detected in response to the judging level signal (inspection tolerance signal) from a judging-level setting circuit 207 and the output from the detector 206 is inputted through a selector switch SW2 to a reference data memory 208 or an inspected data memory 209. The outputs from the memories 208 and 209 are inputted to a judging circuit 210 which judges whether an inspected card is defective or non-defective.

Figure 25:
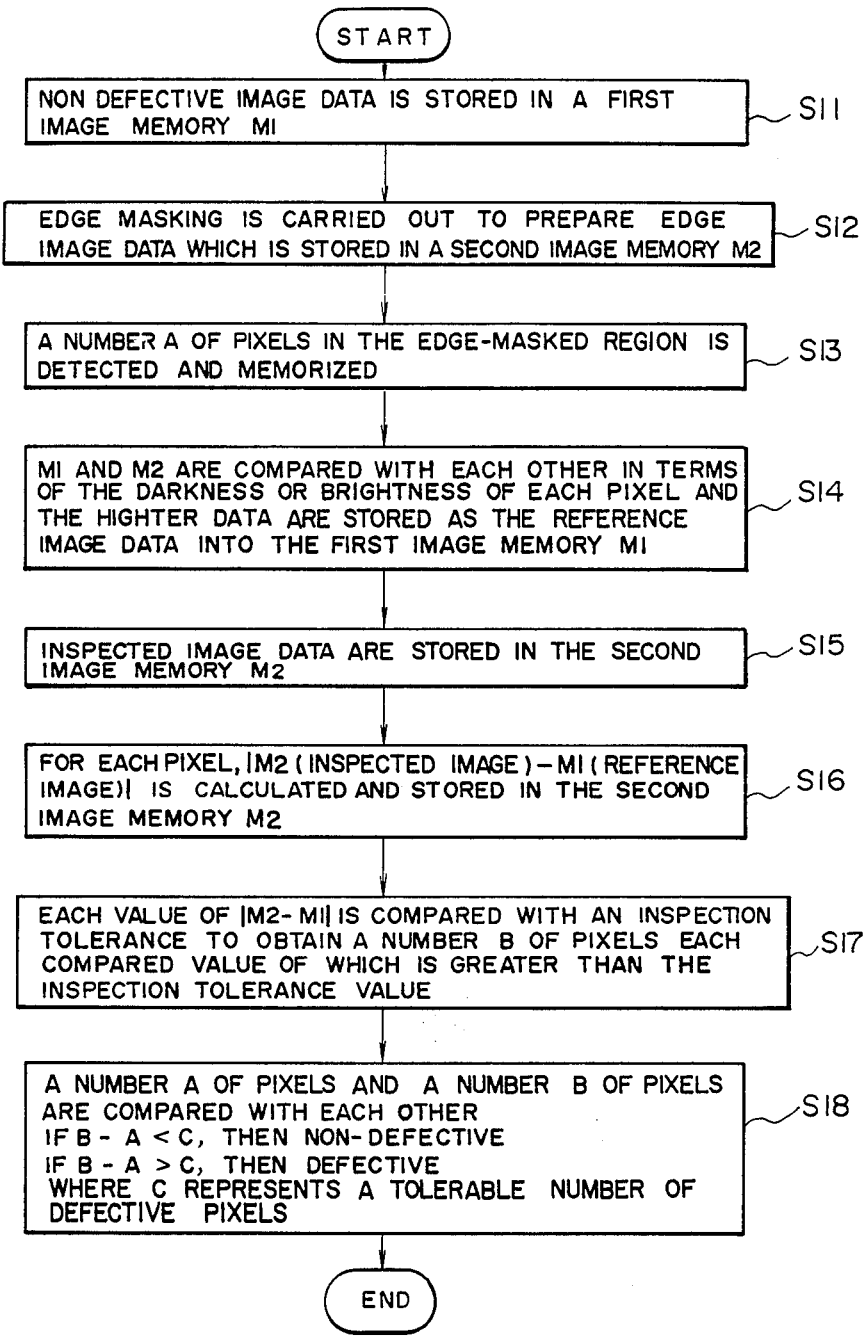
FIG. 25 is a flowchart of an image inspection method by an image processor.
Figure 26:
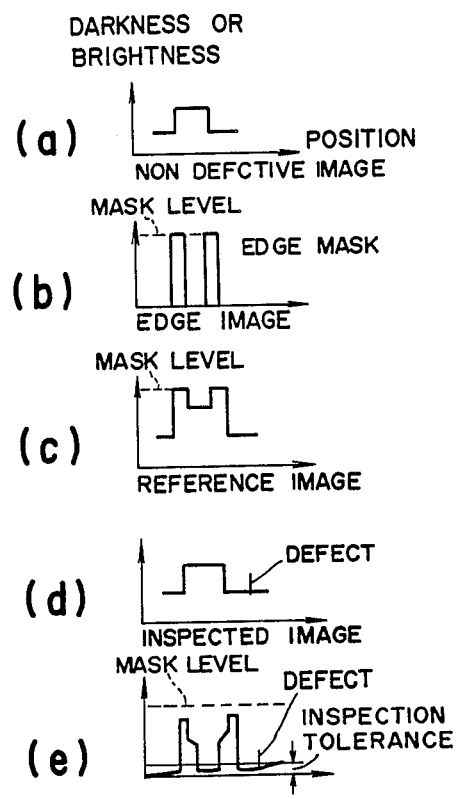
FIGS. 26(a) to 26(e) are waveforms of data processed in the steps shown in FIG. 25.

FIG. 25 is a flowchart and FIG. 26 shows waveforms, both of which are for explaining the mode of operation of the image processor 5 shown in FIG. 24.

First, the selector switches SW1 and SW2 are set on setting terminals, respectively, so that the non-defective image data are stored into the first image memory M1 (S11). In this case, the image as shown in FIG. 26(a) is stored. FIG. 26 shows waveforms obtained when a scanning is carried out along a scanning line. The edge masking processor 203 uses the non-defective image data stored in the memory M1 to provide edge image data as will be described in detail below.

Figure 27:
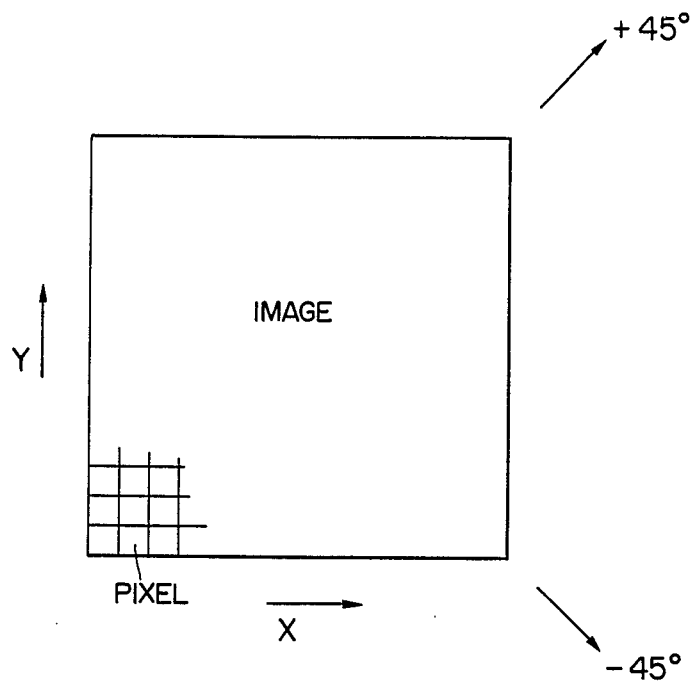
FIGS. 27(a) and 27(b) are plan views showing a way to find an edge of an image.
Figure 27:
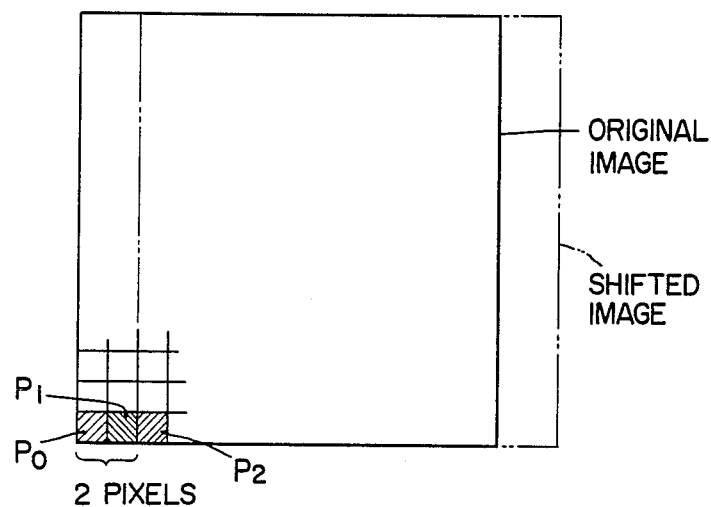

FIGS. 27(a) and 27(b) show a way how to find the edges of an image. The non-defective image is shifted in the four directions, that is, X-axis, Y-axis and two directions inclined by +45° and −45° relative to the X-axis. For example, the non-defective image is shifted along the X-axis by two pixels $P_1$, $P_2$ as shown in FIG. 27(b) and then the darkness or brightness of each pixel of the original image is compared with that of each corresponding pixel of the shifted image. In this case, the darkness or brightness of pixels $P_0$, $P_1$ and $P_2$ located in an edge region is normally remarkably changed. Accordingly, a region where the difference in darkness and brightness of pixels exceeds a predetermined level is considered as an edge region. With respect to other directions, an edge region is detected in the same manner.

The edge portion is masked by a predetermined width. At this time, a mask level is determined at a higher than a level obtained by adding an inspection tolerance to the maximum level of the non-defective image data. The edge portion is masked while the remaining portion is determined at zero. The image thus obtained is called an edge image and is stored in the second image memory M2. FIG. 26(b) shows the stored edge image.

The detector 206 for detecting the number of pixels detects the total number A of pixels in the edge masking region on the basis of the edge image data obtained by all scanning operations in the memory M2 (S13). That is, the number of pixels in the non-zero portion in the edge image is detected and stored in the reference data memory 208 so as to be compared with the number of pixels obtained from the inspected image data. In this case, the judging level setting circuit 207 inputs the judging level that is, inspection tolerance into the detector 206.

Next the pixel darkness or brightness comparator 204 compares, with respect to each pixel, the darkness or brightness of non-defective image data (FIG. 26(a)) stored in the memory M1 with the drakness or brightness of the edge image data (FIG. 26(b)) stored in the memory M2 and the higher value with respect to each pixel is stored in the memory M1. That is, when the non-defective image data stored in the memory M1 are lower or smaller, the edge image data stored in the memory M2 are stored in the memory M1. The data thus obtained are the reference image data as shown in FIG. 26(c).

In the reference image data, the edge portion of the non-defective image is equal to a masking level while the remaining portion is similar to the non-defective image and the reference image data includes a mask for preventing the erratic judgement at the edge portion.

After the reference image data has been stored in the memory M1, the selector switches SW1 and SW2 are set onto inspection terminals so that instead of the edge mask data, the image data to be inspected are stored in the memory M2 (S15). For example, the image data to be inspected are shown in FIG. 26(d).

Thereafter, the calculating circuit 250 calculates the absolute value of the difference between the image data to be inspected stored in the memory M2 and the reference image data stored in the memory M1 and the output of the circuit 205 is stored in the memory M2 (S16). FIG. 26(e) shows the absolute value of the difference.

Since the masking level is higher than a level of a maximum level of the non-defective image data plus the inspection tolerance, if the positional displacement of the inspected image data is within the width of the edge mask (in this case, the card should not be judged as a defective card because of a small displacement), the number of pixels having a level higher than the inspection tolerance becomes equal to the number A of pixels in the edge masking region. If the image data having been inspected have a defect as shown in FIG. 26(d), the waveform shown in FIG. 26(e) has a defect in a position corresponding to that of the defect of FIG. 26(d).

In response to the inspection tolerance level from the judging level setting circuit 207, the detector 206 for detecting the number of pixels detects the number B of pixels (the number A plus the number of defective pixels obtained by all scanning operations) whose level is higher than the inspection tolerance (S17). The output from the detector 206 is stored through the selector switch SW2 into the inspected data memory 209.

Thereafter, the number A of pixels in the edge masking region is inputted from the reference data memory 208 to the judging circuit 210 and simultaneously the number B of pixels whose level is higher than the inspection tolerance is inputted from the inspected data memory 209 to the judging circuit 210. The judging circuit 210 compares the number A with the number B.

if $B-A<C$, then the card is non-defective and
if $B-A>C$, then the card is defective.
where C represents a tolerable number of defective pixels. Thus, the image inspection is completed and the same procedure is repeated to inspect the next card.

According to the present invention, therefore, an article to be inspected can be inspected at a normal position by a camera so that erratic inspections can be avoided and the articles to be inspected can be immediately classified into non-defective articles and defective articles.

What is claimed is:

1. A card-like article inspection device of the type for inspecting the outer appearance of a card-like article to check whether the surfaces of said card-like article have non-defective images or defective images, thereby classifying said card-like article into a first group consisting of non-defective card-like articles or into a second group consisting of defective card-like articles, comprising:
   (a) a table comprising
      (i) an article feeding portion for feeding a plurality of articles to be inspected in an upright and aligned state,
      (ii) a defective-article placing portion disposed in parallel with said article feeding portion for discharging defective articles in an upright and aligned state, and
      (iii) a non-defective article placing portion disposed in parallel with said article feeding portion for discharging non-defective articles in an upright and aligned state;
   (b) an article transfer means disposed along one side of said table for intermittently transferring an inspected article held in an upright state in the lateral direction of said table to said defective article placing portion or said non-defective article placing portion, said article transfer means comprising
      (i) a guide frame disposed along said one side of said table for guiding an inspected article held in an upright state,
      (ii) an article feed frame which is disposed so as to be reciprocated along said guide frame and has feed pawl means to hold an inspected article so as to transfer the same from a first position at the front end of said article feeding portion to a second position at the front end of said non-defective article placing portion adjacent to said article feeding portion and further from said second position to a third position of the placing portion further adjacent to said first mentioned placing portion along said guide means,
      (iii) an article positioning mechanism for positioning an article at said first position so that said article thus positioned is subjected to inspection,
      (iv) an article pushing mechanism for pushing the articles which have been inspected and transferred to said second and third positions into the respective placing portions depending upon the results of the inspection, and
      (v) a synchronizing mechanism for synchronizing the reciprocal movement of said article feed frame with the operation of said article pushing mechanism;
   (c) a camera which is disposed in an opposed relationship with said first position at the front end of said article feeding portion and which inspects the surface of a card held at said first position;
   (d) an image processor for comparing a previously stored reference image with the image of an article being inspected, thereby determining whether said article being inspected is non-defective or defective; and
   (e) a signal processor which controls said image processor and said article transfer means in synchronism with each other.

2. A card-like article inspection device according to claim 1, wherein said table is inclined at a predetermined angle relative to the horizontal plane; and said article feeding portion, said defective article placing portion and said non-defective article placing portion are in the form of an inclined guide passage, respectively.

3. A card-like article inspection device according to claim 2, wherein a pair of parallel guide rails are disposed in the longitudinal direction in each of the three portions of the table.

4. A card-like article inspection device according to claim 2, wherein the table has a temporary card storage portion located adjacent to the card feeding portion in order to place temporarily articles discharged from a card box on the temporary card storage portion.

5. A card-like article inspection device according to claim 2, wherein said non-defective article placing portion has a swingable bed connected to a guide passage via a hinge means, a retractable stop spring being disposed adjacent to said hinge means and normally extended beyond the upper surface of said swingable bed so that when a group of card-like articles is forced to slide over said swingable bed, said group forces said retractable stop spring to be retracted downwardly and when said group of card-like articles passes past said retractable stop spring, said retractable stop spring springs back upwardly, thereby preventing the movement of said group of card-like articles toward said guide passage.

6. A card-like article inspection device according to claim 1, wherein said guide frame has an upper and lower horizontal frames which are respectively provided with two card engaging plates for guiding the upper and lower sides of the articles so that the upright posture of the articles can be kept, the upper horizontal frame having two leaf springs for holding the articles having been pushed into the defective article placing portion and the non-defective article placing portion in their respective positions.

7. A card-like article inspection device according to claim 1, wherein said article feed frame carries out a reciprocating movement by a crank mechanism provided on a rotating main shaft and is carried by a slide rail disposed along the guide frame, the slide rail being swung about its longitudinal axis whereby the article feed frame can be swung in the same direction as that of the slide rail, the slide rail being swung by a cam mechanism on a main rotating shaft.

8. A card-like article inspection device according to claim 7, wherein said article feed frame has first and second feed pawls for holding and releasing the sides of an article, the article feed frame moving between the first and second positions, the first feed pawl transferring an article located in the first position therefrom to the second position, the second pawl transferring an article located in the second position therefrom to the third position.

9. A card-like article inspection device according to claim 8, wherein the first feed pawl is operatively connected to a first solenoid and the second feed pawl is operatively connected to a second solenoid, the second feed pawl releasing an article being transferred shortly before the article reaches the second position in response to a count signal from a partition counter for setting a number of articles to be partitioned.

10. A card-like article inspection device according to claim 1, wherein the article positioning mechanism has a positioning member moved vertically by a cam mechanism provided on a main rotating shaft via a link mechanism, the positioning member having a tapered surface for pushing one corner of an article to place the article in position.

11. A card-like article inspection device according to claim 1, wherein the article pushing mechanism comprises: a pushing frame swung about an axis extending along the main guide frame by a cam mechanism provided on a main rotating shaft; a non-defective article pushing member fixed to the pushing frame and opposed to the third position for pushing a non-defective article toward the non-defective article placing portion in response to the swinging motion of the pushing frame; and a defective article pushing member provided swingably about a vertical axis on the pushing frame for pushing a defective article toward the defective article placing portion by swinging the defective article pushing member toward the main guide frame when the image processor detects the defective article.

12. A card-like article inspection device according to claim 1, wherein the synchronizing mechanism comprises a plurality of cam mechanisms fixed to a main rotating shaft and a plurality of link mechanisms for connecting each cam mechanism with a corresponding operating member.

13. A card-like article inspection device according to claim 1, wherein said image processor comprises memory and circuitry means for:
(a) storing non-defective image data;
(b) effecting a masking process of an edge portion of an image obtained from said non-defective image data, thereby forming edge mask data;
(c) counting a number of pixels or picture elements in the edge region masked from said edge mask data;
(d) storing said edge mask data;
(e) comparing said non-defective image data with said edge mask data, forming reference image data by selecting said non-defective image data or said edge mask data whose darkness or brightness is higher than the other and storing thus obtained reference image data instead of said non-defective image data;
(f) storing image data to be inspected instead of said edge mask data;
(g) storing absolute value data of a difference between said reference image data and said image data to be inspected;
(h) determining whether or not the level of said absolute value data of a difference, with respect to each pixel or picture element, is higher than a predetermined inspection tolerance level and for counting the number of pixels or picture elements whose level is higher than said predetermined inspectin tolerance level; and
(i) comparing the number of pixels or picture elements whose level is higher than the inspection tolerance level with the number of pixels or picture elements in the masked edge portion to determine whether or not a difference between the two numbers is in excess of a tolerable number of defective pixels or picture elements.

14. A method of inspecting the outer appearance of a card-like article to check whether the surfaces of the article have non-defective images or defective images, said method comprising the steps of:
(a) placing a plurality of card-like articles to be inspected on a table in an upright and aligned state;
(b) inspecting the outer appearance of the foremost article by a camera opposed to a first position of one side of the table;
(c) feeding intermittently the article having been inspected along the one side of the table from the first position to a second position adjacent to the first position while an article having been inspected and located in the second position is fed from the second position to a third position adjacent to the second position along the one side of the table; and
(d) pushing the article having been inspected toward a corresponding placing portion on the table according to the result of inspection by an image processor.

15. A method according to claim 14, wherein the step of inspecting the outer appearance of the foremost article by a camera comprises the steps of:
(a) memorizing non-defective image data;
(b) effecting a masking process of an edge portion of an image obtained from said non-defective image data, thereby forming edge mask data;
(c) counting the number of pixels or picture elements in the edge region masked from said edge mask data;
(d) memorizing said edge mask data;
(e) comparing said non-defective image data with said edge mask data, forming reference image data by selecting said non-defective image data or said edge mask data whose darkness or brightness is higher than the other;
(f) memorizing image data to be inspected;
(g) forming absolute value data as a difference obtained by comparing said reference image data with said image data in be inspected;
(h) determining whether or not the level of said absolute value data as a difference with respect to each pixel or picture element is higher than a predetermined inspection tolerance level and counting the number of pixels or picture elements whose level is higher than said predetermined inspection tolerance level; and
(i) comparing the number of pixels or picture elements whose level is higher than the inspection tolerance level with the number of pixels or picture elements in the masked edge portion to determine whether or not a difference between the two numbers is in excess of a tolerable number of defective pixels or picture elements, thereby determining whether the card-like article being inspected is non-defective or defective.

* * * * *